US008295449B2

(12) United States Patent
Bozzone

(10) Patent No.: US 8,295,449 B2
(45) Date of Patent: Oct. 23, 2012

(54) METHOD AND SYSTEM FOR CREATING AUDIO IDENTIFICATION MESSAGES

(75) Inventor: Stephen O. Bozzone, Lauderhill, FL (US)

(73) Assignee: Motorola Mobility LLC, Libertyville, IL (US)

( * ) Notice: Subject to any disclaimer, the term of this patent is extended or adjusted under 35 U.S.C. 154(b) by 1790 days.

(21) Appl. No.: 11/201,603

(22) Filed: Aug. 11, 2005

(65) Prior Publication Data
US 2007/0042758 A1 Feb. 22, 2007

(51) Int. Cl.
*H04M 1/64* (2006.01)

(52) U.S. Cl. .............. 379/88.21; 379/374.02; 455/415; 455/569.1

(58) Field of Classification Search ............ 379/142.06, 379/207.15, 88.21, 374.02; 455/415, 566, 455/569.1
See application file for complete search history.

(56) References Cited

U.S. PATENT DOCUMENTS

| | | | | |
|---|---|---|---|---|
| 5,602,963 A * | 2/1997 | Bissonnette et al. | .......... | 704/275 |
| 5,651,056 A * | 7/1997 | Eting et al. | ................. | 379/88.01 |
| 5,821,874 A * | 10/1998 | Parvulescu et al. | .......... | 340/7.53 |
| 5,875,232 A * | 2/1999 | Wolf | ........... | 379/88.19 |
| 5,875,239 A * | 2/1999 | Koralewski et al. | ..... | 379/142.15 |
| 5,889,852 A * | 3/1999 | Rosecrans et al. | ....... | 379/355.05 |
| 6,038,443 A * | 3/2000 | Luneau | .......... | 455/415 |
| 6,208,713 B1 | 3/2001 | Rahrer et al. | | |
| 6,320,943 B1 * | 11/2001 | Borland | ............ | 379/112.01 |
| 6,466,653 B1 | 10/2002 | Hamrick et al. | | |
| 6,477,390 B1 * | 11/2002 | Gum et al. | .......... | 455/550.1 |
| 6,748,075 B2 * | 6/2004 | Ojiro | ....................... | 379/374.02 |
| 6,804,338 B1 * | 10/2004 | Chen | ........................ | 379/142.08 |
| 7,012,999 B2 * | 3/2006 | Ruckart | ..................... | 379/88.21 |
| 7,020,499 B2 * | 3/2006 | Moffi et al. | ............... | 455/569.1 |
| 7,356,132 B1 * | 4/2008 | Silver et al. | ................ | 379/88.21 |
| 7,693,393 B2 * | 4/2010 | Ohnishi | ........................ | 386/270 |
| 8,103,965 B2 * | 1/2012 | Roberts et al. | ................ | 715/772 |
| 2002/0107049 A1 * | 8/2002 | Maquaire et al. | ............. | 455/563 |
| 2003/0032415 A1 * | 2/2003 | Cho et al. | ..................... | 455/415 |
| 2004/0209605 A1 | 10/2004 | Urban et al. | | |
| 2005/0287997 A1 * | 12/2005 | Fournier | ...................... | 455/415 |

OTHER PUBLICATIONS http://cellular.co.za/news_203/062703-vodafone_promotes_cell_phone_for.htm—Vodaphone promotes cell phone for the blind—Jun. 27, 2003—pp. 1-7.
http://www.prdcat.panasonic.com/shop/NewDesign/ModelTemplate.asp?ModelId=16535—Panasonic ideas for life—KX-TG2680N—2.4GHz GigaRange$^{®}$—pp. 1-3.
http://www.motorola.com/qovernmentandenterprise/id_1655i/en-gb/public/functions/brow—Motorola Government and Enterprise—GP 1280 Professional Series Portable Radio—Motorola South East Europe—p. 1-2.

* cited by examiner

Primary Examiner — Simon Sing

(57) ABSTRACT

The invention concerns a system (100) and method (200, 300, 400) for creating audio identification messages for a first communication device (102). In one arrangement, the method can include the step of populating a call list. This can be done by associating a recorded audio identification message with a caller identification (106) of a second communication device (104) that calls the first communication device, and storing (210) the recorded audio identification message in a call list. The audio identification message can be recorded by a user of the second communication device. In another arrangement, the method can include the steps of playing (308) the audio identification message and initiating (314) a call to an entry associated with the audio identification message.

13 Claims, 6 Drawing Sheets

METHOD AND SYSTEM FOR CREATING AUDIO IDENTIFICATION MESSAGES

BACKGROUND OF THE INVENTION

1. Field of the Invention

This invention relates in general to portable radio devices and more particularly, to simplified communication devices.

2. Description of the Related Art

In today's marketplace, consumers have numerous portable radio devices, such as cellular telephones and personal radios, from which to choose. In order to enable the various functionalities of such devices, several manufacturers have developed innovative and capable user interfaces. For example, some manufacturers provide the facility of menu-driven operation, in addition to keypads that are integrated into mobile communications units. Others provide function keys that are assigned different functionalities at different times, depending on the functionality required while navigating the menus. The operation, which can be performed by pressing the function keys, is displayed on a display screen, and the user is able to make a selection from the options available.

Usage of the numeric keypads and menu-driven functionalities of a mobile communication unit requires that the user is able to understand and perform such actions, so as to get the device to function in the required manner. This makes such mobile communication units difficult to use for children, the elderly, and people with physical disabilities such as diminished eyesight, or those who are unable to perform complex actions by using small keypads or function keys.

Interfaces that incorporate technology such as speech recognition and text-to-speech impose complex computational requirements on the capabilities of the mobile communications units, such as software and digital signal processors. This, in turn, drives up the manufacturing cost of such units.

SUMMARY OF THE INVENTION

The present invention concerns a method of creating an audio identification message for a first communication device. The method can include the step of adding an entry corresponding to a second communication device in a call list present in the first communication device. The entry can be added by obtaining a caller identification of a second communication device, the caller identification being obtained by making a call from the second communication device to the first communication device and recording an audio identification message corresponding to the caller identification. In one arrangement, the audio identification message can be from a user of the second communication device. The method can also include the step of storing the audio identification message in the call list.

The method can further include the steps of storing the caller identification in the call list along with the audio identification message and initiating a call to the entry in the call list. Initiating a call can include the step of scrolling through entries in the call list in which the audio identification messages associated with various caller identifications are played. As an example, recording the audio identification message can be performed remotely over a call.

The method can also include the step of modifying the entry in the call list by recording a new audio identification message for the caller identification. In one embodiment, the method can include the steps of generating an alert message when recording of the audio identification message fails and generating an acknowledgement message when recording of the audio identification message is successfully completed.

The method can also include the steps of playing the audio identification message upon receiving an incoming call from the second communication device and playing a default audio identification message if a call is received from another communication device and the caller identification of this communication device cannot be obtained. As an example, one or both of the first and second communication devices can be wireless communication devices.

The present invention also concerns a first communication device. The first communication device can include a processor, a recording module coupled to the processor and a memory, which can also be coupled to the processor. The processor can be programmed to obtain a caller identification of a second communication device when a call is received at the first communication device from the second communication device. In addition, the recording module can be capable of recording an audio identification message corresponding to the caller identification in which the audio identification message is from a user of the second communication device. The memory can store a call list including the corresponding audio identification message. The first communication device can also include suitable software and circuitry for performing any of the steps recited above.

The present invention also concerns a communication system, which can include a first communication device and a second communication device. The first communication device can be capable of communicating with the second communication device over a communication network or through a point-to-point communication process. The first communication device and (possibly) the second communication device can be similar to the embodiment described above. As an example, the communication network can be a push-to-talk communication network.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
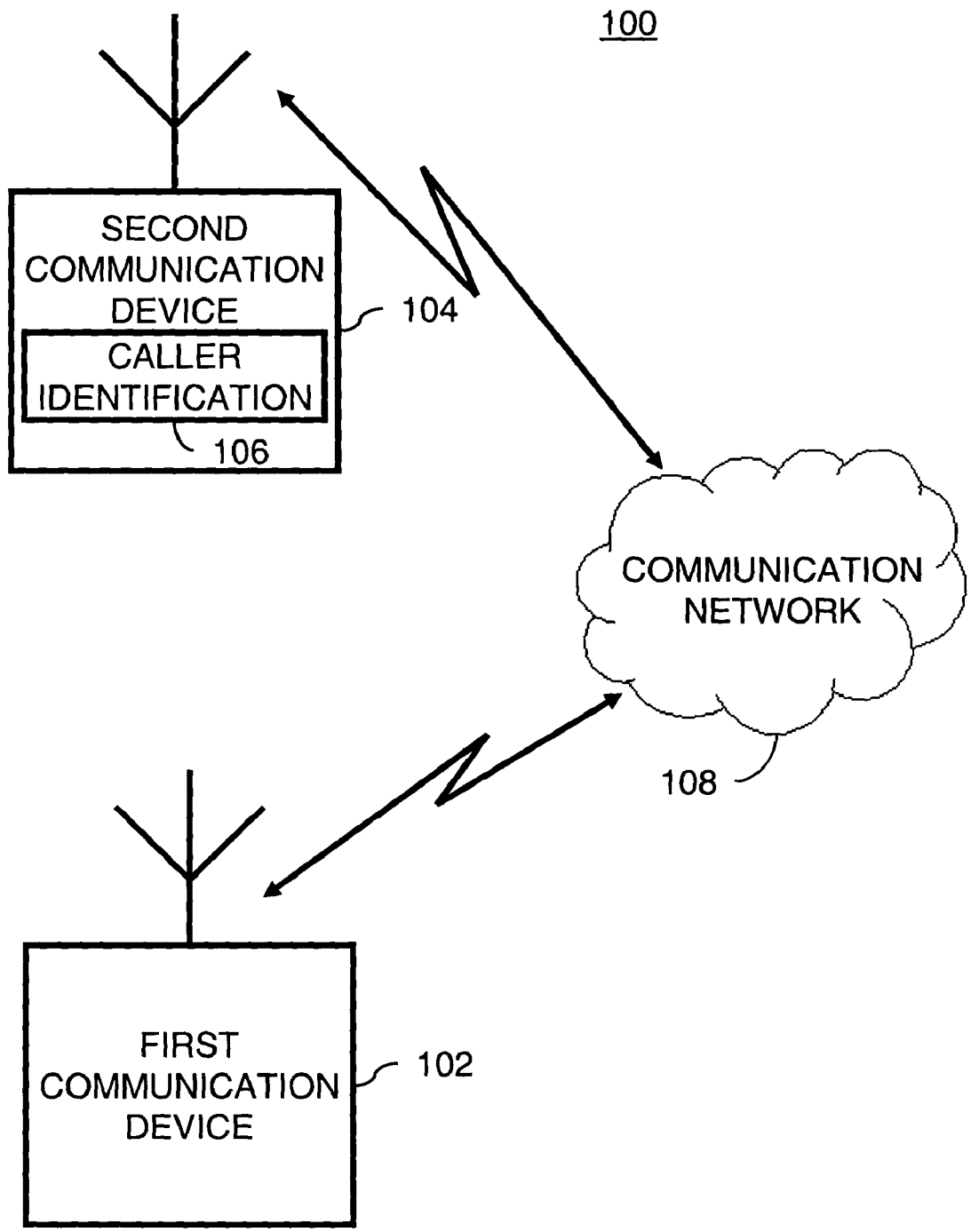
FIG. 1 illustrates an example of an operational environment, in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality" as used herein, is defined as two or more than two. The term "another" as used herein, is defined as at least a second or more. The terms "including" and/or "having" as used herein, are defined as comprising (i.e., open language). The term "coupled" as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The invention concerns a method and system for creating audio identification messages. In one arrangement, the method can include the steps of calling a first communication device from a second communication device, to obtain a caller identification of the second communication device, recording an audio identification message, and storing the recorded audio identification message in a call list after associating it with the caller identification.

In one particular embodiment, the method can also include the steps of activating the call list, selecting an entry in the call list, playing the audio identification message associated with the entry, initiating a call to the entry if desired, and repeating the process by selecting the next entry in the call list. In addition, the method can also include the steps of playing an audio identification message associated with the caller identification of the second communication device that calls the first communication device, playing a default audio identification message when the caller identification of the second communication device is not stored as an entry in the call list, and accepting or declining incoming calls.

Referring to FIG. 1, a block diagram of an example of a communication system 100 is shown. In one embodiment, the system 100 can include a first communication device 102 and a second communication device 104. The second communication device 104 can generate a caller identification 106 when calling the first communication device 102, a process that is known in the art. As an example, the first communication device 102 and the second communication device 104 can be wireless or mobile devices and can communicate with each other by utilizing a communication network 108. Of course, one or both of the first communication device 102 and the second communication device 104 can be wired communication devices that may communicate with one another through the communication network 108. As such, the communication network 108, as those of skill in the art will appreciate, can be configured to support both wired and wireless communications.

In one arrangement, the second communication device 104 may call the first communication device 102. While calling the first communication device 102, the second communication device 104 can transmit the caller identification 106 through the communication network 108. A caller identification can include any suitable type of data that enables the receiving communication device to identify the calling communication device and to provide such identification to a user of the receiving communication device. As an example, the caller identification can include the name and phone number associated with the user of the calling communication device.

Figure 2:
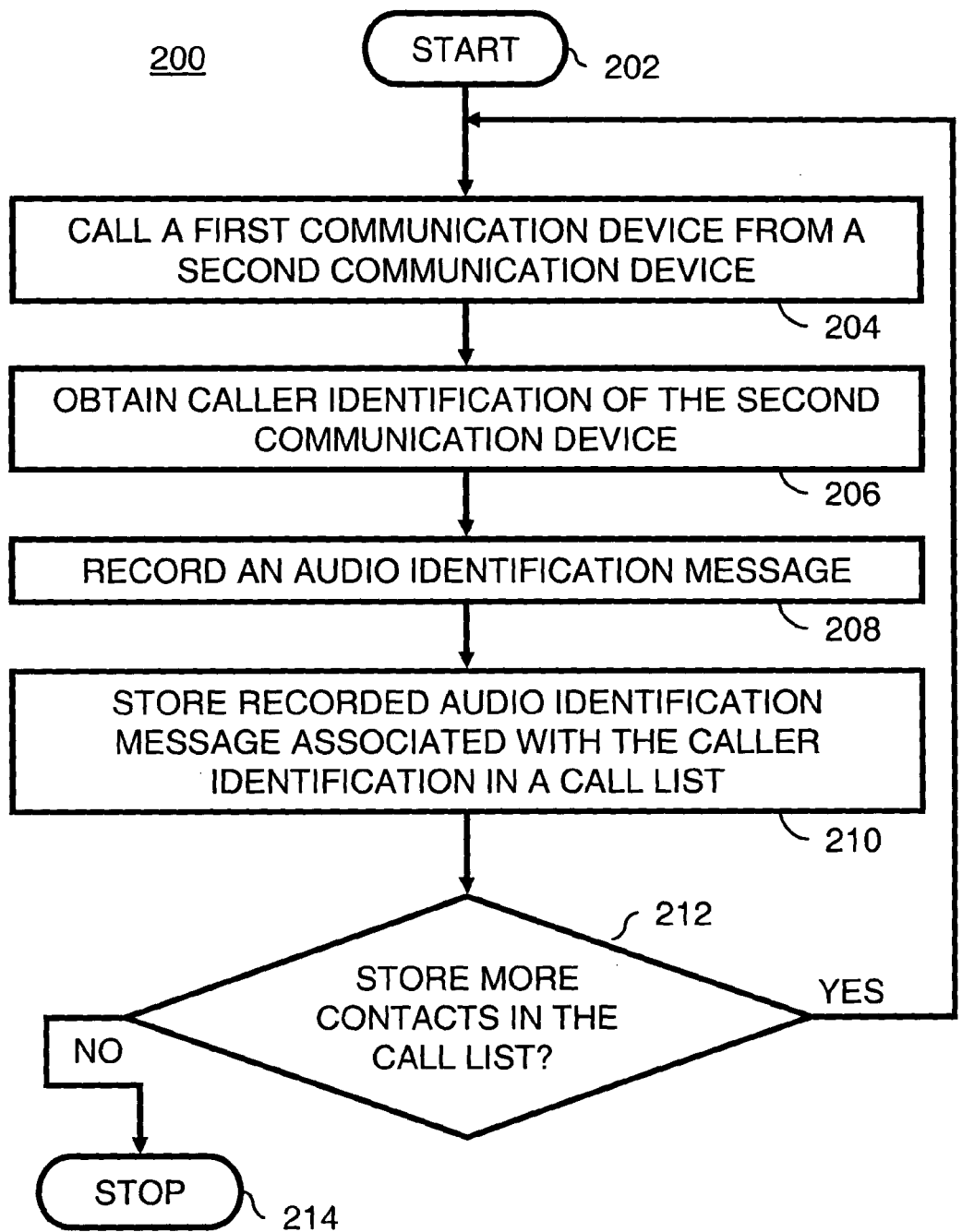
FIG. 2 illustrates an example of a method for populating a call list, in accordance with an embodiment of the inventive arrangements.

Referring to FIG. 2, a method 200 for populating a call list is shown. To describe the method 200, reference will be made to FIG. 1, although it is understood that the method 200 can be implemented in any other suitable device or system. Moreover, the invention is not limited to the order in which the steps are listed in the method 200. In addition, the method 200 can contain a greater or a fewer number of steps than those shown in FIG. 2. Several suitable examples of the method 200 will be presented below.

In one arrangement, the method 200 can include one or more method steps for storing contacts in a call list. At step 202, the method 200 can begin. At step 204, a first communication device 102 can be called from a second communication device 104. At step 206, a caller identification 106 of the second communication device 104 can be obtained by the first communication device 102. At step 208, an audio identification message can be recorded. An audio identification message can be any segment of audio that may enable the user of the first communication device 102 to recognize that the audio segment is associated with a particular person or other suitable entity. For example, the audio identification message can be a sound clip such as "Mom," which can be spoken by the mother of the user associated with the first communication device 102. As another example, a ring tone or a sequence of tones or beeps may be considered an audio identification message.

If the recording of the audio identification message is successfully completed, the first communication device 102 can generate an acknowledgement message and can transmit the acknowledgement message to the second communication device 104. Conversely, if the recording of the audio identification message fails, the first communication device 102 can generate and transmit to the second communication device 104 an alert message. As such, the user of the second communication device 104 can be assured that his or her audio identification message has been successfully recorded.

In a particular arrangement, the audio identification message can be recorded remotely. For example, a user of the second communication device 104 may be remotely located from a user of the first communication device 102 when the cal is received. Using any suitable user interface, the user of the second communication device 104 can begin speaking and the voice signal can be transmitted to the first communication device 102. In this example, this voice signal can be the audio identification message.

In response, the first communication device 104 can record the incoming voice signal (the audio identification message). This recording step, because it may be initiated at the second communication device 104, does not require any need for an action to be performed on the first communication device 102. To trigger the recording process at the first communication device 102, the second communication device 104 can send to the first communication device 102 any suitable form of data, such as a set of processor instructions, which can be transmitted along with the audio identification message. In one arrangement, the term "remotely located" can mean that the user of the second communication device 104 is located at a distance at which such user's normal speaking voice cannot be captured by a microphone of the first communication device 102 for recording purposes.

In another arrangement, the user of the second communication device 104 may use a suitable user interface of the first communication device 102 to record his or her audio identification message. For example, the user of the second communication device 104 may activate a user interface on the first communication device 102 and may begin speaking. The user's voice can be captured by, for example, a microphone (not shown) of the first communication device 102. In this example, the user of the second communication device 104 is not remotely located.

The recorded audio identification message can be associated with the caller identification 106 and stored in a call list as a contact, as shown at step 210. At step 212, it can be determined whether more contacts are to be stored in the call list. If more contacts are to be stored, as determined at step 212, the method of steps 204 to step 212 can be performed again. This process can be repeated as many times as required, to store any number of contacts in the call list. If no more contacts are to be stored, as can be determined at step 212, the method 200 can end at step 214. In one arrangement, any of the entries in the call list can be modified, such as by recording a new audio identification message for the caller identification.

In a particular arrangement, the method 200 can allow a user, such as the mother of a child, to populate the call list on the first communication device 102, which can be used by the child. For example, the mother can populate the call list on the first communication device 102 by calling the first communication device 102 from her second communication device 104. For this, the caller identification 106 received at the first communication device 102 can be associated with an audio identification message from the mother, which can be recorded and stored in the first communication device 102. The caller identification 106 with the associated audio identification message can then be stored in the call list on the first communication device 102, as described above. Subsequently, the same process can be repeated to store a father's number on the first communication device 102.

Figure 3:
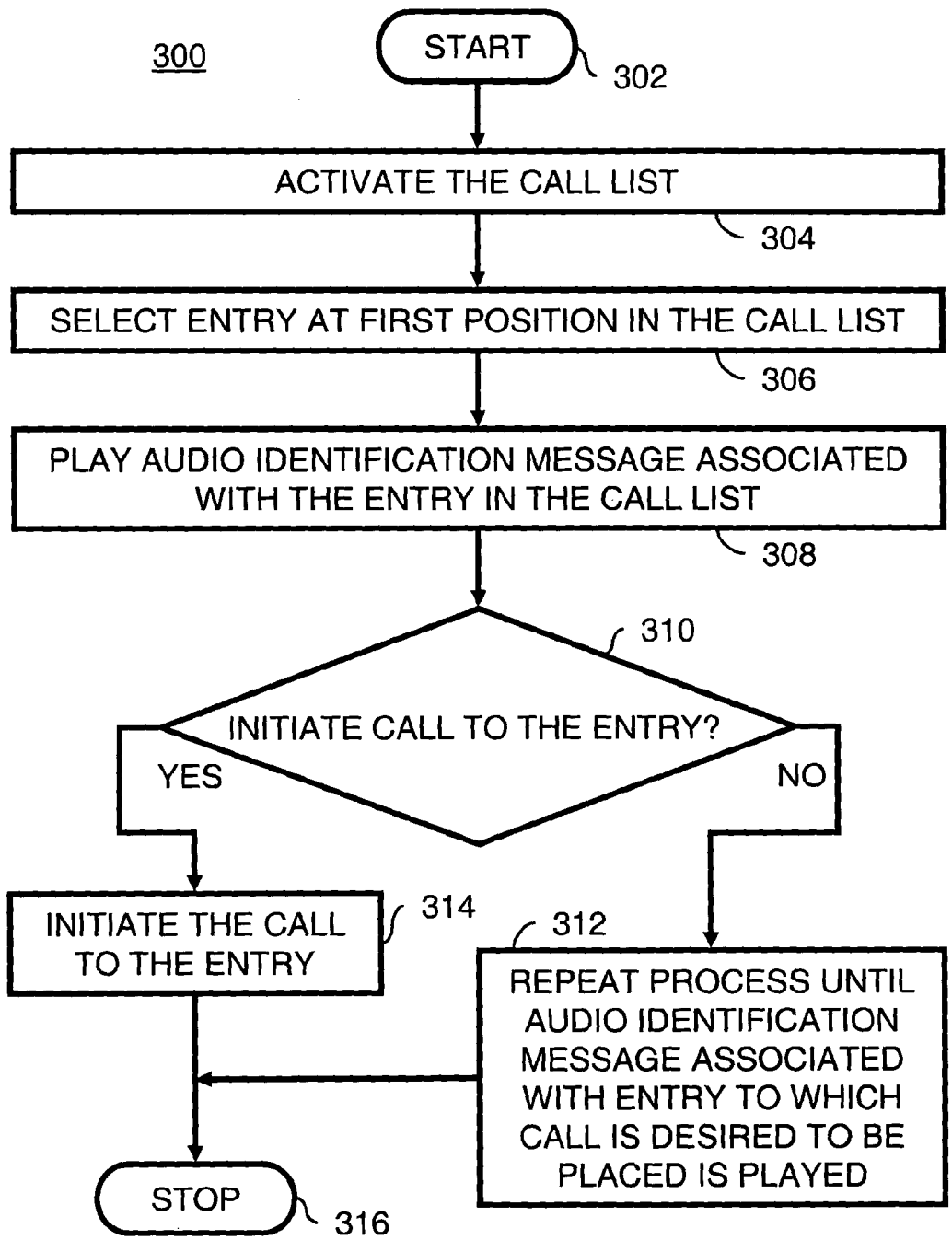
FIG. 3 illustrates an example of a method for initiating a call to an entry in the call list, in accordance with an embodiment of the inventive arrangements.

Referring to FIG. 3, a method 300 for initiating a call to an entry in the call list is shown. To describe the method 300, reference will be made to FIG. 1, although it is understood that the method 300 can be implemented in any other suitable device or system. Moreover, the invention is not limited to the order in which the steps are listed in the method 300. In addition, the method 300 can contain a greater or fewer number of steps than those shown in FIG. 3. Several suitable examples of the method 300 will be presented below.

In one arrangement, the method 300 can include one or more method steps for initiating a call to an entry in the call list. At step 302, the method 300 can begin. At step 304, the call list can be activated. This activation can be performed by any action, such as by pressing one or more buttons on the first communication device 102 or pressing one or more buttons in a predefined sequence. At step 306, an entry at a first position in the call list can be selected. The selection of the entry can be performed by any suitable action. For example, a user can take an action such as holding down one or more buttons on the first communication device 102, pressing one or more buttons in a predefined sequence, or moving a scrolling wheel or other suitable mechanism in a particular manner.

At step 308, an audio identification message associated with the selected entry in the call list can be played. For example, as the audio identification message is selected, the first communication device 102 can broadcast the audio identification message to its user. This technique can allow the user of the first communication device 102 to hear the audio identification message and to decide whether to select or pass over the present entry in the call list.

At step 310, it can be determined whether a call is to be initiated to the entry based on the played audio identification message. The method 300 can be repeated until an audio identification message associated with an entry to which a call is to be placed is played at step 312, if a call is not to be initiated to the entry, as determined at step 310. As an example, if the first communication device 102 includes a scrolling wheel (not shown), the user of the first communication device 102 can scroll through entries in the call list. As the user performs this scrolling step, the first communication device 102 can play or broadcast the audio identification messages associated with the various caller identifications that are part of the call list. The call to the entry can be initiated at step 314, if a call is to be initiated to the entry, as determined at step 310. The method 300 can end at step 316.

Figure 4:
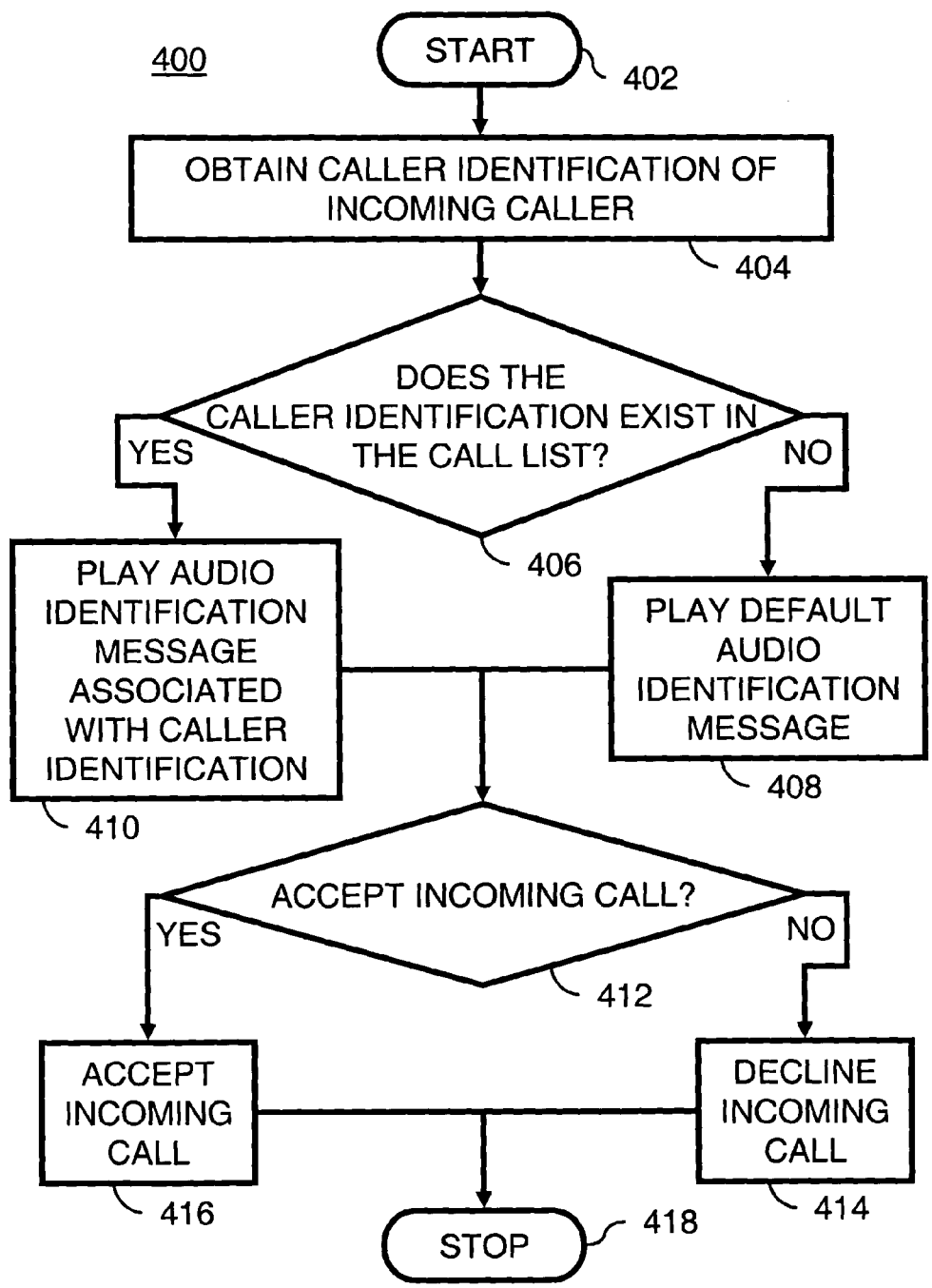
FIG. 4 illustrates an example of a method for playing audio identification messages and accepting or declining a call, in accordance with an embodiment of the inventive arrangements.

Referring to FIG. 4, a method 400 for receiving a call is shown. To describe the method 400, reference will be made to FIG. 1, although it is understood that the method 400 can be implemented in any other suitable device or system. Moreover, the invention is not limited to the order in which the steps are listed in the method 400. In addition, the method 400 can contain a greater or a fewer number of steps than those shown in FIG. 4. Several suitable examples of the method 400 will be presented below.

In one arrangement, the method 400 can include one or more method steps for receiving a call. At step 402, the method 400 can begin. At step 404, the caller identification 106 of an incoming caller can be obtained. The caller identification 106 can be included in an incoming call to the first communication device 102. At step 406, it can be determined whether the caller identification 106 exists in the call list. The first communication device 102 can do so by comparing the obtained caller identification 106 with the caller identification(s) stored in the first communication device 102.

A default audio identification message can be played at step 408 if it is determined at step 406 that the radio identification 106 obtained from the incoming call does not exist in the call list. For example, if the telephone number or other unique identifier of the second communication device 104 is not recognized, the first communication device 102 can play an audio message, such as "unknown" or "unrecognizable." Conversely, an audio identification message associated with the caller identification 106 can be played at step 410, if it is determined at step 406 that the caller identification 106 exists in the call list.

At step 412, it can be determined whether the incoming call is to be accepted. This determination can be based on the user of the first communication device 102 selectively answering the call or on any settings or programming that can be included in the first communication device 102. These settings or programming can be set or prepared by the user or a manufacturer of the first communication device 102. For example, the user may program his or her first communication device 102 to not accept any calls from his or her place of work. The incoming call can be declined at step 414, if it is determined at step 412 that the call is not to be accepted. The incoming call can be accepted at step 416, if it is determined at step 412 that the call is to be accepted. The method 400 can end at step 418.

In another arrangement, the user of the second communication device 104 can initiate an answering of the incoming call at the first communication device 102. For example, the second communication device 104, when it initiates the call to the first communication device 102, can transmit instructions for the first communication device 102 to automatically answer the incoming call. As such, the incoming call can be answered without the user of the first communication device 102 taking any active steps to answer it (such as pushing a button on the device 102). This process can enable the user of the second communication device 104 to speak with the user of the first communication device 102 if the user of the device 102 is in a condition that prevents them from answering the call. As another example, the first communication device 102 can automatically answer the call after a predetermined time from when the call is first received from the second communication device 104.

Figure 5:
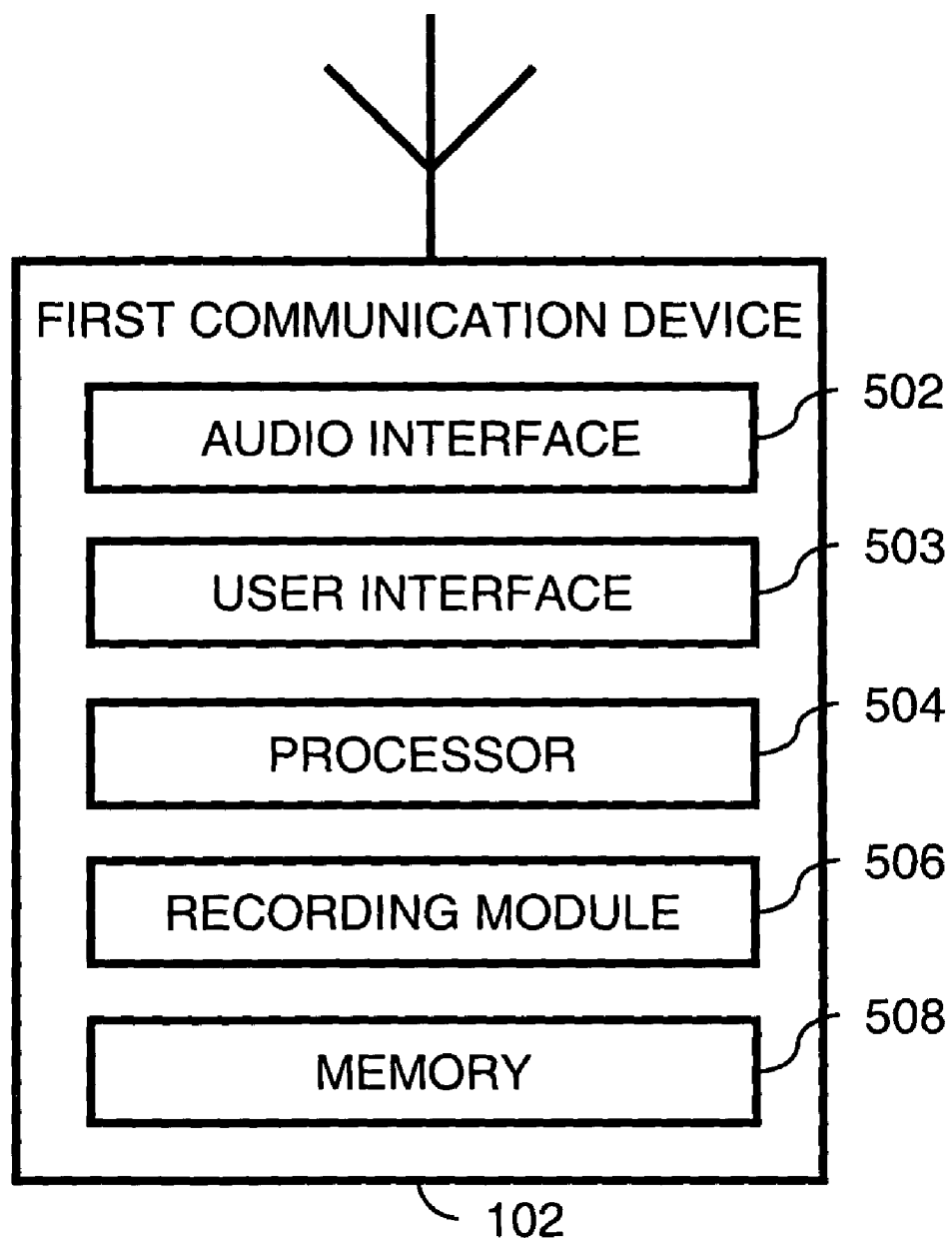
FIG. 5 illustrates an example of a block diagram of the first wireless device, in accordance with an embodiment of the inventive arrangements.

Referring to FIG. 5, a block diagram of an example of a first communication device 102 is shown. Those of skill in the art will appreciate that the first communication device 102 may include all or even a fewer number than the components shown in FIG. 1. Also, those of skill in the art will understand that the first communication device 102 may include additional components that are not shown here but are not germane to the operation of the first communication device 102 in accordance with the inventive arrangements.

Here, the first communication device 102 can include an audio interface 502, a processor 504, a recording module 506, and a memory 508. The first communication device 102 may also include a user interface 503. The user interface 503 can include any suitable number and type of controls or components that enable a user to interact with the first communication device 102, which includes making and receiving calls and accessing the call list described above. For example, the audio interface 502 may be part of the user interface 503 and may include one or more speakers (not shown). The user interface 503 may also include one or more microphones, one or more keypads or other button arrangements (not shown) and one or more displays (not shown). As will be described below, it is optional for the first communication device 102 to include a display.

The processor 504, for example, can provide processing capabilities for the various functions of the first communication device 102. As an example, the processor 504 can obtain the caller identification 106 of an incoming caller and can compare the caller identification 106 with those stored in the call list. Based on this comparison, the processor 504 can direct the recording module 506 to record the audio identification message. The processor 504 can also signal the audio interface 502 to play audio identification messages in accordance with the discussion above. The memory 508, for example, can store the call list and any other data that can be required by the first communication device 102. The first communication device 102 may also include one or more mixers (not shown) and one or more power circuits (not shown). In one arrangement, the construction of the second communication device 104 can be similar to that of the first communication device 104, although the invention is certainly not limited to this particular configuration.

Although the first communication device 102 may include a display, such a configuration is not necessary. In particular, because the first communication device 102 employs audio identification messages that a user can hear when deciding whether to initiate a call or when receiving a call, the visual aspect of caller identification is obviated. This design can assist users who may be visually impaired and can reduce costs in view of eliminating the need for a display.

Figure 6:
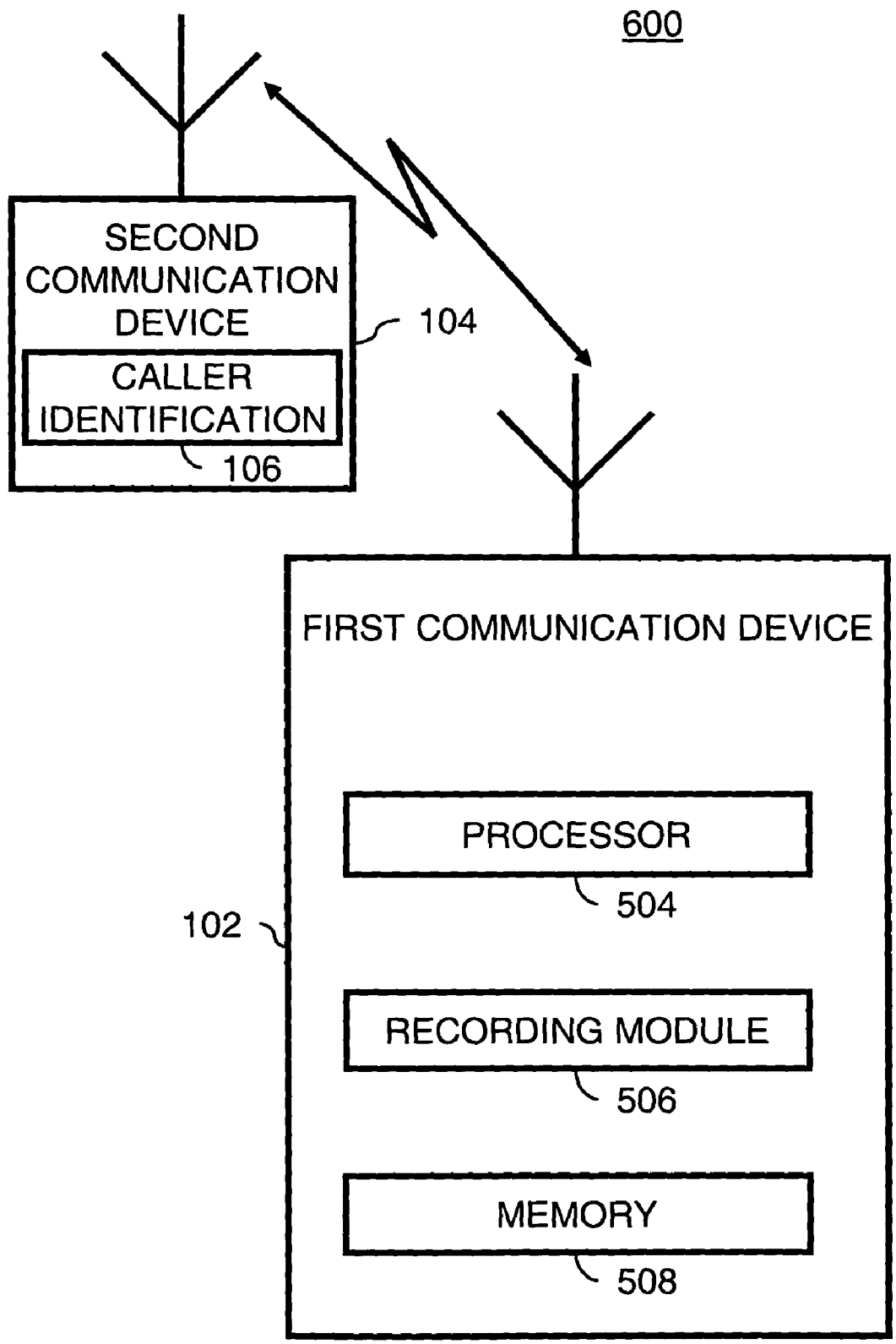
FIG. 6 illustrates an example of a system diagram of a first wireless device and a second wireless device operating through a point-to-point communication process, in accordance with an embodiment of the inventive arrangements.

Referring to FIG. 6, a system diagram of the first communication device 102 and a second communication device 104 operating through a point-to-point communication system 600 is shown. To describe the communication system 600, reference will be made to FIGS. 1 and 5, although it is understood that the communication system 600 can be implemented in any other suitable device or system configuration. In addition, the communication system 600 can contain a greater or fewer number of system elements than those shown in FIG. 6.

Here, the communication system 600 can include the first communication device 102 and the second communication device 104, communicating with each other by utilizing a point-to-point configuration. As an example, a point-to-point configuration can enable the first communication device 102 and the second communication device 104 to communicate with one another without the assistance of a network, such as Motorola's MOTOtalk™. Audio identification messages can be created and stored in this configuration, similar to the processes described previously. In the communication network 108 of FIG. 1 or the point-to-point configuration described here, the first communication device 102 and the second communication device 104 can be configured with components to enable dispatch or interconnect communications. As an example, the devices 102 and 104 can be outfitted with push-to-talk buttons (not shown) to permit dispatch communications between them and other communication units. As such, the communication network 108 can be a push-to-talk communication network.

Where applicable, the present invention can be realized in hardware, software or a combination of hardware and software. Any kind of computer system or other apparatus adapted for carrying out the methods described herein are suitable. A typical combination of hardware and software can be a mobile communication device with a computer program that, when being loaded and executed, can control the mobile communication device such that it carries out the methods described herein. The present invention can also be embedded in a computer program product, which comprises all the features enabling the implementation of the methods described herein and which when loaded in a computer system, is able to carry out these methods.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of creating an audio identification message for a first communication device, comprising:
adding an entry corresponding to a second communication device in a call list present in the first communication device by:
obtaining a caller identification of a second communication device, the caller identification being obtained by a call from the second communication device to the first communication device;
recording an audio identification message corresponding to the caller identification, wherein the audio identification message is from a user of the second communication device;
storing the audio identification message in the call list;
storing the caller identification in the call list along with the audio identification message;
initiating a call to the entry in the call list, wherein initiating the call comprises scrolling through entries in the call list in which the audio identification messages associated with various caller identifications are played; and generating an alert message when recording of the audio identification message fails.

2. The method according to claim 1, wherein recording the audio identification message is performed remotely over a call.

3. The method according to claim 1, further comprising:
modifying the entry in the call list by recording a new audio identification message for the caller identification.

4. The method according to claim 1, further comprising:
playing the audio identification message upon receiving an incoming call from the second communication device.

5. The method according to claim 1, further comprising:
playing a default audio identification message if a call is received from another communication device and the caller identification of this communication device cannot be obtained.

6. The method according to claim 1, wherein one or both of the first and second communication devices are wireless communication devices.

7. A method of creating an audio identification message for a first communication device, comprising:
adding an entry corresponding to a second communication device in a call list present in the first communication device by:
obtaining a caller identification of a second communication device, the caller identification being obtained by a call from the second communication device to the first communication device;
recording an audio identification message corresponding to the caller identification, wherein the audio identification message is from a user of the second communication device;
storing the audio identification message in the call list;
storing the caller identification in the call list along with the audio identification message;
initiating a call to the entry in the call list, wherein initiating the call comprises scrolling through entries in the call list in which the audio identification messages associated with various caller identifications are played; and
generating an acknowledgement message when recording of the audio identification message is successfully completed.

8. The method according to claim 7, wherein recording the audio identification message is performed remotely over a call.

9. The method according to claim 7, further comprising:
modifying the entry in the call list by recording a new audio identification message for the caller identification.

10. The method according to claim 7, further comprising:
generating an alert message when recording of the audio identification message fails.

11. The method according to claim 7, further comprising:
playing the audio identification message upon receiving an incoming call from the second communication device.

12. The method according to claim 7, further comprising:
playing a default audio identification message if a call is received from another communication device and the caller identification of this communication device cannot be obtained.

13. The method according to claim 7, wherein one or both of the first and second communication devices are wireless communication devices.

* * * * *